Oct. 19, 1948.  C. F. TELFOR ET AL  2,451,993
HOLDING DEVICE
Filed Dec. 26, 1944  2 Sheets-Sheet 1
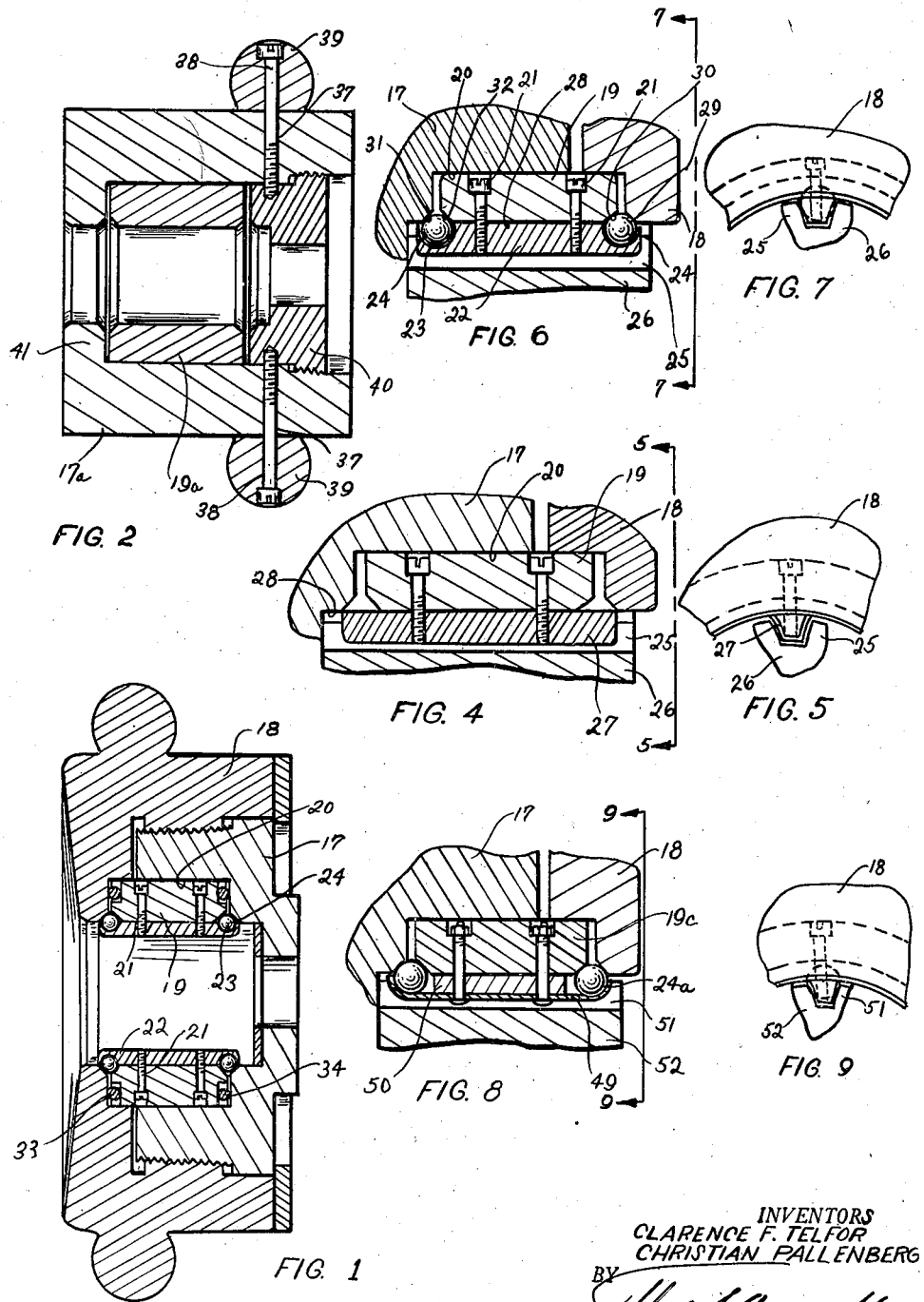
INVENTORS
CLARENCE F. TELFOR
CHRISTIAN PALLENBERG
BY
THEIR ATTORNEY

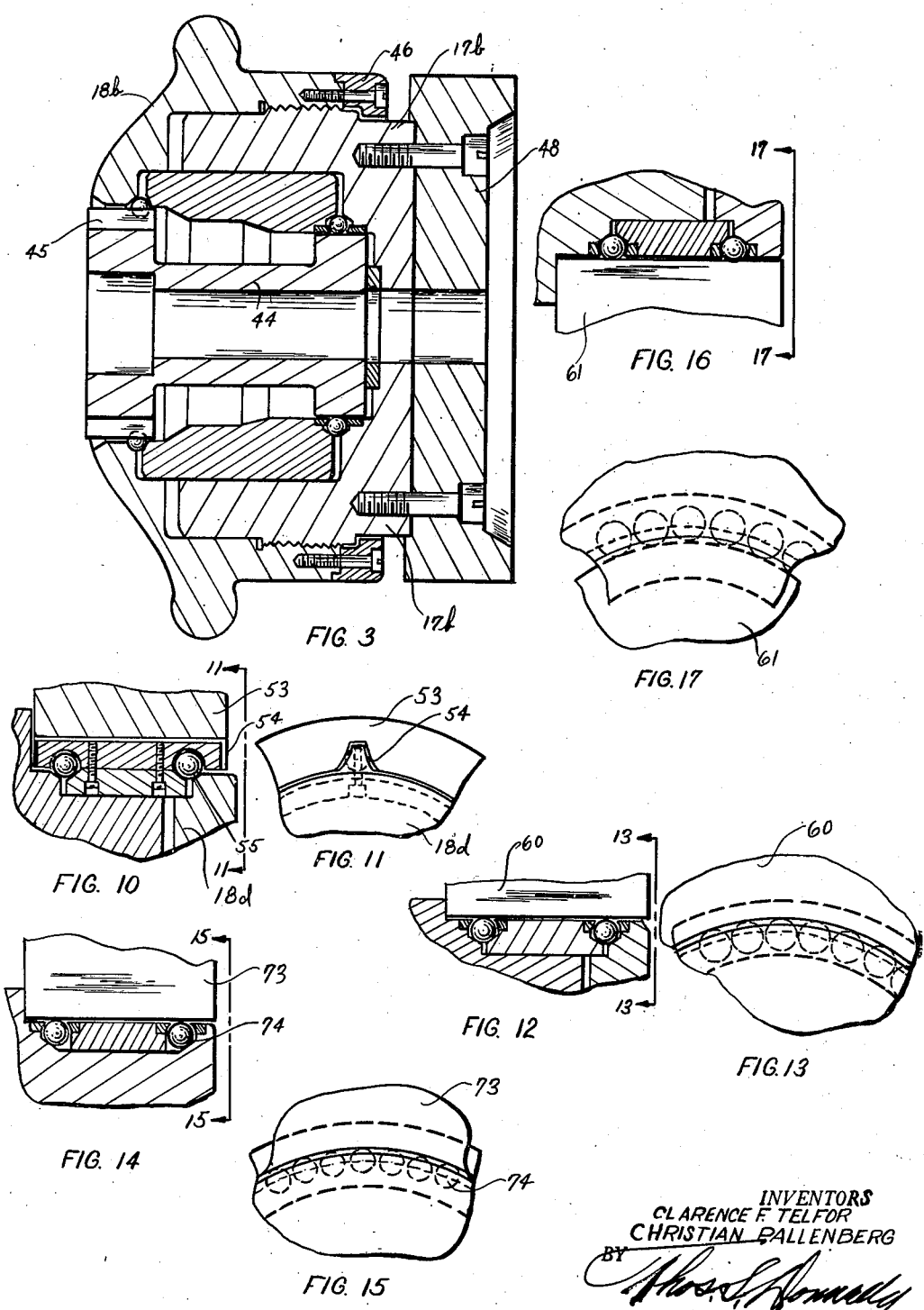

Patented Oct. 19, 1948

2,451,993

UNITED STATES PATENT OFFICE 2,451,993

HOLDING DEVICE

Clarence F. Telfor, St. Clair Shores, and Christian Pallenberg, Detroit, Mich.

Application December 26, 1944, Serial No. 569,903

4 Claims. (Cl. 279—1)

Our invention relates to a new and useful improvement in a holding device adapted primarily for holding a gear centered while the bore thereof is being ground or bored out or while the periphery of the hub thereof is being turned down.

It is an object of the present invention to provide a holding device of this class whereby the gear will be properly centered relative to the turned down periphery or the reamed out bore.

Another object of the invention is the provision of a device of this class whereby the object held may be easily and quickly clamped in fixed position.

Another object of the invention is the provision of a holding device of this type which will be simple in structure, economical of manufacture, durable, compact, easily and quickly operated, possessed of a minimum number of parts and highly efficient in use.

Another object of the invention is the provision in a holding device of this type of ball retainers and of protecting members for protecting the ball retainers.

Another object of the invention is the provision of a holding device of this type in which engaging balls are moved radially inwardly or outwardly to grip the member held.

Another object of the invention is the provision of a holding device of this type which may be used to engage the workpiece externally and press the engaging balls radially inwardly or which may be used to engage within the workpiece and force the engaging balls radially outwardly.

Another object of the invention is the provision of a holding device having engaging balls to bear against the teeth of a gear and so arranged and constructed that axial thrust will force the engaging balls at one end of the retainer into engaging relation and then force the engaging balls and its retainer, together with the object held, axially until an inclined face engages the other balls in the retainer and forces them to move radially into engaging position.

Another object of the invention is the provision in a holding device of this type of engaging balls and resilient means serving to release the balls from engagement upon release of pressure which forces them into engagement.

Other objects will appear hereinafter.

It is recognized that various changes and modifications may be made in the detail of structure illustrated without departing from the invention itself and it is intended that such changes and variations shall be encompassed within the scope of the claims which form a part hereof.

Forming a part of this specification are drawings in which,

Fig. 1 is a central, sectional view of the invention;

Fig. 2 is a central, sectional view of a modification;

Fig. 3 is a central, sectional view of the invention showing a slight modification;

Fig. 4 is a fragmentary, sectional view illustrating the retainer protector;

Fig. 5 is a fragmentary side elevational view of the structure shown in Fig. 4;

Fig. 6 is a fragmentary sectional view illustrating the type of ball retainer shown in Fig. 3;

Fig. 7 is a fragmentary side elevational view of the structure shown in Fig. 6;

Fig. 8 is a fragmentary sectional view similar to Fig. 6, showing a slight modification;

Fig. 9 is a fragmentary elevational view of the structure shown in Fig. 8;

Fig. 10 is a fragmentary sectional view showing the invention used on an internal gear;

Fig. 11 is a fragmentary elevational view of the structure shown in Fig. 10, taken on line 11—11 of Fig. 10;

Fig. 12 is a fragmentary sectional view showing the invention used on a plain surface body;

Fig. 13 is a fragmentary and elevational view of the structure shown in Fig. 12, taken on line 13—13 of Fig. 12;

Fig. 14 is a fragmentary sectional view of a further modification;

Fig. 15 is a side elevational view of the structure shown in Fig. 14, taken on line 15—15 of Fig. 14;

Fig. 16 is a fragmentary sectional view similar to Fig. 12, excepting that the balls are moving inwardly instead of outwardly;

Fig. 17 is a fragmentary end elevational view of the structure shown in Fig. 16, taken on line 17—17 of Fig. 16.

In the drawings, we have illustrated a supporting member 17 on which is threaded a thrust cap 18. A bushing 19 is provided which is adapted to seat in the bore 20 of the support 17. Secured by suitable bolts 21 (see Fig. 6) to lie axially of and in engagement with the inner surface of the bushing 19 are the ball retainers 22 having pockets 23 in which are positioned balls 24. The construction is such that these retainers 22 engage between the teeth 25 of the gear 26. These retainers 22 are circumferentially spaced and preferably between each retainer is mounted a guard plate 27 (see Fig. 4) which is of greater length than the retainers 22. When the gear 26 is positioned within the bore 28 of the bushing 19 and the thrust cap 18 is threaded into position, from an examination of Fig. 6, it will be obvious that as the thrust cap 18 moves into position, the inclined surface 29 on the thrust cap will engage the ball 24 which is outermost and force it inwardly against the inclined surface 30 on the retainer 22. These inclined surfaces will force the ball radially downwardy into engagement with the side faces of the teeth on opposite sides thereof, there being sufficient play at the bottom of the pockets 23 to permit this movement. When the clamping relation thus effected becomes tight enough, the bushing and the gear will be moved axially of the support 17 until the innermost ball will engage the inclined surface 31 while in engagement with the inclined surface 32 and this ball will be forced inwardly into clamping relation. Since these sets of balls are positioned properly circumferentially spaced about the gear, it is obvious that a centering of the gear relative to the support will be effected and the gear will be held in tight position.

Surrounding the bushing are rings 33 and 34 of yieldable material, such as rubber or the like. As the nut or cap 18 is threaded on to move the various parts into proper operative position, these rings 33 and 34 will be subjected to pressure and compressed to a certain degree. While in this position, they serve as a means for sealing against leakage of dust and dirt into the mechanism. When the pressure is released, they will have a tendency to move the bushing axially so that the balls which are in close engagement with the inclined surfaces and pressed thereby will be relieved of this pressure and an easy and quick removal of the gear from the holding device may be accomplished.

In Fig. 2, we have shown a structure differing somewhat from the structure shown in Fig. 1. In this structure, the support 17a is provided with a spiral slot 37 into which project the pins 38 carried by the hand wheel 39. These pins project into a nut 40 which serves the same purpose as the cap 18 by delivering thrust to the balls. A flange 41 serves as an abutment to engage the forward end of the bushing 19a. In the form shown in Fig. 1, the pressure is exerted from the front. In the form shown in Fig. 2, the pressure is exerted from the rear.

In Fig. 3, we have shown a slight modification in which a workpiece 44 is mounted on the holding device and provided with an external gear 45 at one end and a non-toothed periphery at the other end; the cap 18b is held in position by the ring 46 and serves to cooperate with the support 17b to exert the necessary pressure on the holding device, the support being secured to a suitable base 48.

In Fig. 8, we have shown a modification in which a spring 49 serves as the retainer for the balls 24a, this spring member 49 being spaced from the bushing 19c by means of the spacer block 50, the balls lying between the teeth 51 of the gear 52.

In Fig. 10, we have shown the structure used with an internal gear 53 having the teeth 54. The inclined surfaces 55 are faced outwardly and when the cap 18d is threaded into position, the balls will be moved radially outwardly.

In Fig. 12, we have shown a structure somewhat similar to the structure shown in Fig. 10, excepting that the workpiece 60 is provided with a plain bore, the device being adapted for engaging such a workpiece.

In Fig. 14, we have shown a slight modification in which the workpiece 73 is engaged on its periphery by the balls 74.

In Fig. 16, we have shown a structure similar to Fig. 12, excepting the balls surround the workpiece 61 and move radially inwardly to effect the clamping.

What we claim as new is:

1. A holding device of the class described adapted for holding a gear, comprising: a supporting member having a bore formed therein; a bushing mounted in said bore and movable axially thereof; a plurality of axially directed ball retainers mounted on said bushing in circumferential spaced relation and projecting radially inwardly from the inner face of said bushing and adapted for engaging between the teeth of a gear placed within said bushing; balls on each of said retainers and engaging between the teeth of the gear; a thrust member mounted on said supporting member and movable for delivering an axial thrust to said bushing; means for moving said balls radially upon axial movement of said bushing.

2. A holding device of the class described adapted for holding a gear, comprising: a supporting member having a bore formed therein; a bushing mounted in said bore and movable axially thereof; a plurality of axially directed ball retainers mounted on said bushing in circumferential spaced relation and projecting radially of said bushing; balls on each of said retainers engageable between the teeth of the gear; a thrust member mounted on said supporting member and movable for delivering an axial thrust to said bushing; and means for moving said balls radially upon axial movement of said bushing.

3. A holding device of the class described adapted for holding a gear, comprising: a supporting member having a bore formed therein; a bushing mounted in said bore and movable axially thereof; a plurality of axially directed ball retainers mounted on said bushing in circumferential spaced relation and projecting radially of said bushing; balls on each of said retainers engageable between the teeth of the gear; a thrust member mounted on said supporting member and movable for delivering an axial thrust to said bushing; and means for moving said balls radially upon axial movement of said bushing; and a plurality of circumferentially spaced axially directed guard members on said bushing between said ball retainers and of greater length than said ball retainers for limiting axial movement of said bushing.

4. A holding device of the class described comprising a supporting member having a bore formed therein; a bushing mounted in said bore and movable axially thereof and adapted for reception of a gear placed therein; a plurality of axially directed ball retainers in circumferential spaced relation and mounted on said bushing and projecting radially inwardly from the inner face thereof and engageable between the teeth of the gear placed within said bushing; balls on each of said retainers and adapted for engaging between the teeth of a gear and engaging the same upon axial movement of said bushing; a thrust member mounted on said supporting member and movable for delivering an axial thrust to said bushing; and means for moving said balls radially upon axial movement of said bushing.

CLARENCE F. TELFOR.
CHRISTIAN PALLENBERG.

REFERENCES CITED

The following references are of record in the file of this patent:

UNITED STATES PATENTS

| Number | Name | Date |
| --- | --- | --- |
| 836,487 | Crone | Nov. 20, 1906 |
| 1,021,011 | Sponable | Mar. 26, 1912 |
| 1,407,145 | Gasteiner | Feb. 21, 1922 |
| 1,664,085 | Naylon | Mar. 27, 1928 |
| 1,800,291 | Graves | Apr. 14, 1931 |
| 2,040,601 | Dunn | May 12, 1936 |